United States Patent [19]

Chang et al.

[11] Patent Number: 4,548,998
[45] Date of Patent: Oct. 22, 1985

[54] THERMOSETTING HIGH SOLIDS SOLVENT-BASED POLYESTER-URETHANE COATING COMPOSITION AND A METHOD OF PREPARING SAME

[75] Inventors: Wen-Hsuan Chang, Gibsonia; Ronald R. Ambrose, Allison Park, both of Pa.

[73] Assignee: PPG Industries, Inc., Pittsburgh, Pa.

[21] Appl. No.: 679,187

[22] Filed: Dec. 7, 1984

[51] Int. Cl.$^4$ .................... C08F 283/00; C08G 63/76
[52] U.S. Cl. .................... 525/441; 525/443; 528/288; 528/307; 528/308
[58] Field of Search .............. 525/441, 443; 528/288, 528/308, 307

[56] References Cited

U.S. PATENT DOCUMENTS 4,410,667 10/1983 Porter et al. .................... 525/443 X
4,410,668 10/1983 Piccirilli et al. ................ 525/443 X
4,485,228 11/1984 Chang et al. .......................... 528/84

*Primary Examiner*—Lucille M. Phynes
*Attorney, Agent, or Firm*—Godfried R. Akorli

[57] ABSTRACT

This invention encompasses an improved high solids, solvent-based, thermosetting composition having the necessary hardness and flexibility that make it an effective coating for both elastomeric and hard metal substrates. The composition comprises a polyester-urethane polyol and a curing agent such as an aminoplast. The improvement herein comprises the method of preparing the polyester-urethane polyol which comprises reacting together urea, polyamine and a polyester polyol.

20 Claims, No Drawings

THERMOSETTING HIGH SOLIDS SOLVENT-BASED POLYESTER-URETHANE COATING COMPOSITION AND A METHOD OF PREPARING SAME

BACKGROUND OF THE INVENTION

1. Field of the Invention:

The present invention relates to thermosetting, solvent-based polyurethane polyols. More specifically, the invention relates to an improved thermosetting, solvent-based, high solids coating comprising polyester-urethane polymers that are useful in coating both elastomeric and metal substrates, and an improved method of preparing same.

2. Brief Description of the Prior Art:

There are known in the art coating compositions that can be applied to elastomeric substrates. These coating compositions are characterized by excellent flexibility, particularly at low temperatures. Illustrative of these coating compositions are those based on polyester-urethane polyols of relatively high molecular weight which are cured with aminoplasts. Another illustration of these coating compositions are those based on polymeric polyols such as soft polyurethane polyols cured with a stoichiometric excess of aminoplast curing agents. Yet another illustration of these coating compositions are those comprising thermosetting resins, for example, hard polyester polyols, soft polyurethane polyols and aminoplast curing agents. It has been found that while these elastomeric coatings have a reasonable degree of hardness, they are not sufficiently hard to be used effectively on hard metallic substrates.

Coating compositions that can be applied to rigid substrates such as hard metallic substrates are known in the art. These coating compositions are characterized by excellent hardness. An illustration thereof are coating compositions based on polyester polyols and acrylic polymers cured with aminoplasts or isocyanates. These metallic coatings, generally, are not flexible enough to be used effectively on elastomeric substrates.

In this state of the art, an article, with rigid and elastomeric parts, requires two types of coatings for the final topcoat: one suitable for elastomeric parts and the other suitable for rigid parts. For pigmented topcoats, this requirement presents problems of color-matching of the different parts. Those skilled in the art would appreciate how difficult it is to prepare durable coatings having, conjointly, the properties of flexibility and hardness. It would be all the more difficult to prepare high solids compositions having the conjoint properties. In commonly assigned co-pending U.S. applications Ser. Nos. 538,630 (now U.S. Pat. No. 4,485,228, granted Nov. 27, 1984) and 538,631, there are disclosed high solids coating compositions, the cured coating of which has, conjointly, excellent properties of flexibility, durability and hardness which make it useful for coating on both elastomeric and hard metal parts. The disclosed coating compositions comprise polyester-urethane polyols and methods of preparing same. Typically, the polyester-urethane polyols are prepared by reacting a polyisocyanate with a polyester polyol formed from reacting a polycarboxylic acid and a polyol, or functional equivalents thereof.

The present invention provides an alternate method of preparing polyurethane polyols useful for coatings that have the conjoint properties of hardness and flexibility. Notably, the preparation of the polyurethane polyol useful herein does not entail the use of polyisocyanates.

SUMMARY OF THE INVENTION

In accordance with the foregoing, the present invention encompasses an improved high solids, solvent-based, thermosetting coating composition having a sprayability of at least 40 percent, which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F., and in that when the coating composition is deposited on a metallic substrate and cured, the coated substrate has a Sward hardness of at least 14; said coating composition contains a film-former comprising a polyester-urethane polyol and a curing agent; the polyester-urethane polyol has a hydroxyl value of at least 50 and comprises (A) about 60 to 95 percent by weight acyclic moieties, and optionally (B) up to about 30 percent by weight cyclic moieties; the sum of the weight percentage of cyclic moieties and the weight percentage of urethane moieties multiplied by 3 is from about 15 to 65. The weight percent is based on the total weight of the polyester-urethane polyol; the improvement comprising preparing the polyurethane polyol by reacting together urea, polyamine and polyester polyol.

The coating compositions of this invention are preferably of high solids type, that is, they are sprayable at high solids content. The sprayability is the maximum concentration of solids at which the coating composition can be atomized sufficiently to form a uniformly deposited coating, under normal spraying conditions of, say, temperature, pressure, and spray equipment design such as entails the use of an air suction spray gun operating at 60 psi with a No. 30 air cap. This maximum concentration is solvent dependent and usually occurs in a viscosity range of 15–19 seconds with a No. 4 Ford cup at room temperature after thinning with a solvent such as a mixture of methyl amyl ketone and 2-ethoxyethyl acetate. Above this maximum concentration, appearance, leveling and solvent popping typically become unacceptable. With the high solids, the desired coating thickness and appearance is obtained without enumerable coating applications. Additionally, coating compositions of this type meet air pollution standards which require a reduction of organic solvent emissions of today's organic solvent-based coating compositions.

In this context, by the term "thermosetting" is meant that the coating composition, upon heating, will solidify or set to form a coating which will not remelt on further heating.

The flexibility property of the coating can be determined by spray coating an elastomeric substrate and curing the coating at optimum conditions to give a dry film thickness of 1.5 to 2 mils. The elastomeric substrate is 1/16 to 3/16, typically ⅛-inch thick, thermoplastic polyurethane, such as commericially available from Mobay Company as TEXIN 355D. The coated substrate is bent around a ½-inch diameter mandrel with the coating side facing outward. After bending, the coating is examined for breaks and cracks. Testing can be conducted at temperatures such as room temperature, that is, 72°–77° F., or at lower temperatures. The lower temperatures can be obtained by cooling the coated substrate to standard temeratures of 45° F., 35° F., or 0°

F. before bending. The lower the temperature, the more stringent the test. Preferably, the coating can withstand bending at 20° F., more preferably 0° F. The flexibility property of the coating is considered as good when there is no break in the coating or substantially no break, i.e., when the occurring break is not completely across the width of the substrate which is about 1 to 3 inches, at the measured temperature.

The hardness property of the coating composition can be determined by the Sward method using a Sward Rocker as described in ORGANIC COATING TECHNOLOGY, Payne, Vol. 1, 1965, pages 642-643. Testing is done on an optimally cured coating having a dry film thickness of 1½ to 2 mils over 20 gauge steel panels.

The hydroxyl value of the polyester-urethane polyol of the coating compositions is determined according to ASTM-E-222-76, Method B (reflux one hour). In the context of the foregoing, the invention is more fully described hereinbelow.

DETAILED DESCRIPTION OF THE INVENTION

The coating compositions of the present invention can be of high solids type and have, conjointly, the properties of hardness and flexibility. Preferably, for automotive topcoat usage, the coating composition will be formulated to be weather durable. More specifically, the coating compositions can have a sprayability of at least 40 percent, and can produce durable cured coatings having a flexibility to withstand ½-inch mandrel bend at 35° F. (2° C.) and a Sward hardness of at least 14. Weather-durability can be predicted in certain instances by accelerated tests.

The sprayability of the coating composition is preferably about 40 percent and more preferably about 55 percent by weight.

The flexibility and hardness properties are imparted to the coating composition by the acyclic and cyclic content as well as the urethane content of the polyester-urethane polyols present therein. By cyclic content is meant the weight percent of the ring component of the polyester-urethane polyol, e.g.,

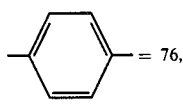

based on its total weight. By urethane content is meant the weight percent of the component which is of the structure:

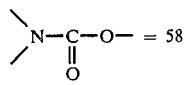

in the polyester-urethane polyol based on its total weight. By acyclic content is meant the weight percent of the component other than the afore-described cyclic and urethane moieties of the polyester-urethane polyol.

To impart the required flexibility, the reactants are selected on the basis that they provide acyclic moieties in the reaction product in an amount sufficient to provide a cured coating with a flexibility to withstand at least ½-inch mandrel bend at 35° F., preferably at 20° F., and more preferably at 0° F. Accordingly, the polyester-urethane polyol typically contains from about 60 to 95, and preferably from about 75 to 85 percent acyclic moieties.

To impart the required hardness, the reactants are selected on the basis that they provide urethane moieties and/or cyclic moieties in the resultant polyester-urethane polyols in an amount sufficient to provide cured coatings with a Sward hardness of at least 14, preferably 18, and more preferably 30. Accordingly, the polyester-urethane polyol typically contains up to about 30, and preferably from about 10 to 25 percent cyclic moieties.

In providing the required hardness, the amounts of the cyclic moieties and the urethane moieties can be adjusted. Accordingly, the cyclic moieties and the urethane moieties are in the following relationship. On a formula weight basis, the sum of the cyclic moieties and three times the sum of the urethane moieties in the polyester-urethane polyol in the range of 15 to 65 and preferably from 35 to 55, Accordingly, the polyester-urethane polyol contains from about 1 to 20 percent and preferably 5 to 10 percent by weight urethane moieties.

Preferably, the coating compositions of the invention will be durable to weathering. This property is usually evaluated by outdoor exposure in Florida in the U.S.A. or in climates similar thereto. Preferably, coating compositions of the invention, when properly evaluated, will be able to withstand one-year exposure in Florida while maintaining at least 30 percent of their initial gloss.

In preparing the polyester-urethane polyol, urea and polyamine containing at least two primary amino groups are reacted with a polyester polyol which is formed from the reaction of an organic polycarboxylic acid or a derivative thereof and a polyol.

The useful urea can be substituted, or unsubstituted urea which is preferred herein. The substituted urea can be hydrocarbyl substituted such as alkyl or aryl substituted ureas or the like.

The polyamine containing at least two primary amino groups may be any amine of the general formula $H_2N$-R-$NH_2$ wherein R is an alkyl, alkenyl, aryl, or aralkyl or a substituted group thereof or a mixture thereof typically containing from about 4 to 36 carbon atoms. While the above structure depicts diamine, higher functional amines can be used in limited instances.

Non-limiting examples of the amines useful herein are trimethyl-hexamethylene diamine, hexamethylene diamine, tetramethylene diamine, isophorone diamine, and menthane diamine.

The polyester polyol is prepared preferably by reacting an organic polycarboxylic acid or a functional equivalent thereof such as an anhydride or a lower alkyl ester, with an organic polyol. Diacids are preferred, although higher functional polyacids can be used, preferably in admixture with the diacids. Non-limiting examples of the cyclic polycarboxylic acids or their functional equivalents are o-phthalic acid, isophthalic acid, terephthalic acid, o-hexahydrophthalic acid, m-hexahydrophthalic acid, p-hexahydrophthalic acid, tetrahydrophthalic acid or a hydrocarbyl-substituted hexahydrophthalic acid wherein the hydrocarbyl group can be an alkyl, alkenyl or aryl group. Of these acids, the aliphatic one such as hexahydrophthalic acid or its anhydride is preferred.

Besides the cyclic polycarboxylic acids or their functional equivalents, acyclic polycarboxylic acids containing from at least 2, preferably about 2 to 20 carbon atoms, may also be employed. Examples thereof include succinic acid, glutaric acid, adipic acid, suberic acid and sebacic acid. Further, mixtures of cyclic polycarboxylic acid with acyclic carboxylic acid can be employed.

The polyols employed in the preparation of the polyester can be cyclic or acyclic and preferably are aliphatic polyols. Diols are preferred, although higher functional polyols such as triols can be used, preferably in admixture with the diols. Examples of the cyclic polyols are bisphenol A, hydrogenated bisphenol A, cyclohexanediol and cyclohexanedimethanol. Examples of the acyclic polys are those containing, preferably, from about 2 to 18 carbon atoms. Non-limiting examples of the acyclic polyols are 2,2,4-trimethyl-1,3-pentanediol, 1,4-butanediol, neopentyl glycol, and 1,6-hexanediol. Mixtures of the polyols, for example, cyclic and acyclic polyols, can be employed. Preferably, the polyol contains neopentyl group branching such as derived from neopentyl glycol and 2,2-dimethyl-3-hydroxypropyl-2,2-dimethyl-3-hydroxypropionate, Typically, the polyester will contain from about 10 to 60, more preferably from about 15 to 40 percent by weight of the alcohol branched neopentyl groups. The percentage by weight is based on the weight of the polyol which contains the neopentyl branching divided by the total weight of the polyol ingredients which are used in preparing polyester polyols. While the use of diols is preferred herein, higher functionality polyols such as triols can be used, preferably in admixture with the diols. An example of the higher functional polyol is trimethylolpropane.

The reaction of the acid with the polyol is an esterification reaction which is well known in the art. In accordance with this invention, the resultant polyester is hydroxyl-functional. It is of a low molecular weight, preferably with a hydroxyl value of about 150 to 350. Preferably, the polyesters will contain some residual acid groups. Typically, the polyester will have an acid value of up to 15.

Polyester polyols prepared by other methods and/or with other ingredients can also be used in this invention. For example, polyester polyols from lactones can be prepared by subjecting a lactone to polymerization in the presence of a low molecular weight polyol such as ethylene glycol, diethylene glycol, triethylene glycol, 1,4-butanediol, propylene glycol and cyclohexanedimethanol. This and other methods of preparing polyester polyols in accordance with this invention are hereby encompassed.

The urea, the polyamine and the polyester polyol are reacted together under the following conditions. The reaction is effected by heating a mixture of the urea, polyamine and polyester polyol at temperatures ranging from 130° to 200° C., and preferably 170° to 190° C. The reactants are employed in an equivalent ratio of 2:1:1.4 to 77 and preferably 2:1:1.8 to 7 and more preferably 2:1:2.3 to 4.7 of the urea to polyamine to the polyester polyol.

The resultant polyester-urethane polyol described above preferably has a calculated number average molecular weight of from about 300 to 2000 and a hydroxyl value of at least 50. Hydroxyl values lower than 50 are generally less preferred because of higher resin viscosities and the difficulties associated in formulating high solids coating compositions. Hydroxyl values much higher than 250 are generally less preferred because of insufficient flexibility in the resultant coating.

In the practice of the invention, the polyester-urethane polyol is employed in combination with curing agent which is capable of reacting with the active hydrogens in the polyester-urethane polyol to give a thermosetting coating. Examples of curing agents are aminoplasts and isocyanates. A cure catalyst is usually employed.

Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates of diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol. The cure catalysts usually employed are dodecylbenzene sulfonic acid, para-toluene sulfonic acid and butyl stannoic acid.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

Polyisocyanates may also be used as curing agents. Examples of suitable polyisocyanates that can be blocked include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commerically available from Mobay Chemical as DESMODUR N. The polyisocyanate is blocked with suitable blocking agents which would unblock at elevated temperatures such as low aliphatic alcohols such as methanol, oximes such as methyl ethyl ketone oxime, and lactams such as caprolactam.

The amount of polyester-urethane polyol and curing agent which are used in the practice of the invention are preferably adjusted so that the ratio of polyester-urethane polyol:curing agent is within the range of 6 to 0.5:1, preferably 3 to 0.9:1. Ratios of polyester-urethane polyol:curing agent greater than 6:1 are not preferred because hardness and durability of the resultant coating will suffer; whereas ratios less than 0.5:1 are not preferred because flexibility of the resultant coating will suffer.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention are of the high solids type, a liquid diluent is usually present in the composition. By liquid diluent is meant a solvent or non-solvent which is volatile and is removed after the coating is applied and is needed to reduce viscosity sufficiently to enable forces available in simple coating techniques, namely, spraying, to spread the coating to controllable, desired and uniform thicknesses. Also, diluents assist in substrate wetting, resinous component compatibility, package stability and coalescence or film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, monoether glycol acetates such as 2-ethoxyethyl acetate, as well as compatible mixtures thereof. The diluent is present in amounts up to 60 percent by weight, usually 35 to 55 percent by weight, based on total weight of diluent and resin solids.

In addition to the above ingredients, various fillers, plasticizers, anti-oxidants, U.V. light absorbers, stabilizers, flow control agents, surfaces and other formulating additives can be employed if desired. These materials are optional and generally constitute up to about 10 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings are particularly useful on resilient and rubbery substrates, elastomeric parts, plastics, and on metal surfaces such as steel and aluminum. In accordance with this invention, the same coating composition can be used to coat an article having elastomeric and metallic parts. Hence, automobiles, for example, can be assembled and painted with the same coating in accordance with this invention. Since the same coating is employed, it is relatively easier to obtain color matching.

The combination of outstanding properties of the coating compositions of the present invention make them useful for a wide variety of applications. They can be used for coating automotive parts such as automobile bodies and trucks cabs. Also, they can be used for other coating applications such as coatings for appliance parts such as refrigerators and washing machines, and they can also be used for coil coating applications.

In general, coating thickness will vary depending upon the application desired. In general, coatings from about 0.5 to 3 mils have been found to be useful in most applications.

After application to the substrate, the coatings are cured. Curing is usually conducted at temperatures of about 100° to 200° C., and in most cases, a cure schedule is from about 20 to 30 minutes at about 120° to 150° C. Higher or lower temperatures with correspondingly shorter or longer times can be utilized, although the exact cure schedule best employed depends upon the nature of the substrate as well as the particular components used in formulating the coating compositions.

The coating compositions of the present invention can be applied to the substrate in a clear-over-color application in which a pigmented or colored basecoat is first applied to a substrate, followed by application of a clear topcoat.

The following examples illustrate the invention. All quantities are on a weight basis unless otherwise indicated.

EXAMPLE 1

PART 1

This example illustrates the high solids compositions comprising a polyester-urethane polyol, and the method of preparing same. First, a polyester polyol composition was prepared, as follows:

| Ingredients | Parts by Weight (grams) |
| --- | --- |
| Hexahydrophthalic anhydride | 7165.2 |
| 1,6-Hexanediol | 5493 |
| Neopentyl glycol | 4841.6 |

The above ingredients were charged to a properly equipped reaction vessel and the resultant mixture heated to react in a nitrogen atmosphere. At 170° C. (338° F.), there resulted the production of water of (esterification) reaction. With the continuous removal of the water, heating was continued to 200° C. (392° F.). The reaction mixture was then held at 200° C. (392° F.) for about 18 hours until an acid value of about 9.5 was attained. The resultant mixture was then cooled to a temperature of about 70° C. (158° F.), discharged and analyzed.

Analysis: Determined solids content was 83.5 percent, viscosity was 95.6 stokes, acid value was 9.5 and hydroxyl value was 301.5.

PART 2

A polyester-urethane polyol was prepared with the above polyester polyol composition, as follows:

| Ingredients | Parts by Weight (grams) |
| --- | --- |
| The polyester polyol (as described above) | 850 |
| Urea | 85 |
| Trimethylhexamethylene diamine | 112 |

-continued

| Ingredients | Parts by Weight (grams) |
| --- | --- |
| Triphenyl phosphate | 0.5 |

The above ingredients were charged to a reaction vessel equipped with a trap containing dry ice and isopropanol. The mixture was heated to react in a nitrogen atmosphere. At 140° C., ammonia gas which evolved was condensed and collected. The reaction temperature was held at 140° C. for about 40 minutes. Thereafter, the temperature was raised to 150° C. and held for 4 hours, then raised to 175° C. and held for 4 hours, then to 190° C. and held for 2½ hours, with continuous evolution of ammonia. Thereafter, heating was terminated; this time little or no evolution of ammonia occurred. The reaction mixture was allowed to cool. To 886 grams of the resultant product was added 98 grams of methyl isobutyl ketone.

The determined solids was 81.2 percent, the viscosity was 41.5 stokes, the acid value was 1.3 and hydroxyl value was 176.7.

PART 3

A high solids, thermosetting composition was prepared with the above polyester-urethane polyol, as follows. The polyester-urethane polyol was formulated with an aminoplast curing agent and other ingredients listed below.

| Ingredients | Parts by Weight (grams) |
| --- | --- |
| The polyester-urethane composition | 75 |
| Melamine[1] | 25 |
| Polymeric microparticle[2] | 2 |
| Cellulose acetate butyrate | 1 |
| U.V. absorber[3] | 2 |
| Flow control agent | 0.25 |
| U.V. stabilizer[4] | 0.5 |
| Dodecylbenzene sulfonic acid | 0.3 |
| Thinning solvent[5] | 65.2 |

[1]CYMEL 303 available from American Cyanamid Company.
[2]Prepared as described in Example II of U.S. Pat. No. 4,147,688.
[3]Available from Ciba-Geigy Company as TINUVIN.
[4]Available from Ciba-Geigy Company as TINUVIN.
[5]Methyl amyl ketone/cellulose acetate.

The coating composition had a sprayable resin solids content of 59 percent by weight. This coating composition was sprayed on a ⅛-inch thick thermoplastic polyurethane commercially available from Mobay as TEXIN 355D and as a clear coat on a metal substrate. The obtained films were baked at 250° F. (121° C.) for 30 minutes and then subjected to hard ness and flexibility tests with the following results: The coated substrates exhibited Sward hardness of 26, and withstood a ½-inch mandrel test at 20° F. without a substantial break.

What is claimed is:

1. An improved high solids, solvent-based, thermosetting coating composition having a sprayability of at least 40 percent, which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F.; and in that when the coating composition is deposited on a metallic substrate and cured, the coated substrate has a Sward hardness of at least 14; said coating composition contains a film-former comprising a polyester-urethane polyol and a curing agent; the polyester-urethane polyol has a hydroxyl value of at least 50 and comprises:
   (A) about 60 to 95 percent by weight acyclic moieties, and optionally
   (B) up to about 30 percent by weight cyclic moieties; the sum of the weight percentage of cyclic moieties and the weight percentage of urethane moieties multiplied by 3 is from about 15 to 65; the improvement comprising preparing the polyurethane polyol by reacting urea, polyamine and a polyester polyol.

2. A composition of claim 1, wherein the polyester-urethane polyol has a hydroxyl value of 140 to 250.

3. A composition of claim 1, wherein the polyester-urethane polyol contains from about 10 to 25 percent cyclic moieties.

4. A composition of claim 1, wherein the polyester-urethane polyol contains from about 1 to 20 percent urethane moieties.

5. A composition of claim 1, wherein the polyester-urethane polyol contains from about 5 to 10 percent urethane moieties.

6. A composition of claim 1, wherein the curing agent is an isocyanate, an aminoplast of phenoplast.

7. A composition of claim 1, wherein the polyamine is hexamethylene diamine, trimethylhexamethylene diamine, menthane diamine or isophorone diamine.

8. A composition of claim 1, wherein the polyester polyol is formed from reacting an organic polycarboxylic acid which is a dicarboxylic acid or a derivative thereof and a polyol which is a diol.

9. A composition of claim 8, wherein the organic dicarboxylic acid or a derivative thereof contains cyclic groups.

10. A composition of claim 9, wherein the organic dicarboxylic acid is selected from the class consisting of o-phthalic, isophthalic, terephthalic, o-hexahydrophthalic, p-hexahydrophthalic, iso-hexahydrophthalic, tetrahydrophthalic or hydrocarbyl-substituted hexahydrophthalic acid or a derivative thereof, wherein the hydrocarbyl group is an alkyl, alkaryl or aryl group.

11. A composition of claim 8, wherein the diol is aliphatic.

12. A composition of claim 11, wherein the aliphatic diol is a mixture of a straight chain diol containing from 2 to 20 carbon atoms and a diol containing neopentyl group branching.

13. A composition of claim 12 which contains from 10 to 60 percent by weight neopentyl group branching.

14. A composition of claim 1, wherein the equivalent ratio of the urea to polyamine to polyester polyol is 2:1:1.8 to 7.

15. A high solids, solvent-based, thermosetting coating composition having a sprayability of at least 40 percent, which when cured is weather-durable, and flexible and hard in that when the coating composition is deposited on an elastomeric substrate and cured, the coated substrate can be bent around a ½-inch mandrel with the coating facing outwardly and the coating exhibits substantially no breaks or cracks when tested at 20° F.; and in that when the coating composition is deposited on a metallic substrate and cured, the coated substrate has a Sward hardness of at least 18; said coating composition contains a film-former comprising a polyester-urethane polyol and a curing agent; the polyester-urethane polyol has a hydroxyl value of at least 80 and is prepared by reacting:
   (1) urea, (2) an aliphatic diamine containing alkyl branching with (3) a polyester polyol formed from reacting:

(a) hexahydrophthalic acid or alkyl-substituted hexahydrophthalic acid with (b) a mixed diol comprising:

(i) a straight chain aliphatic diol containing from 2 to 20 carbon atoms, (ii) an aliphatic diol containing neopentyl group branching;

the polyester-urethane polyol containing 70 to 95 percent by weight acyclic moieties and the sum of the weight percentage of cyclic moieties and the weight percent of urethane moieties multiplied by 3 is from 15 to 65.

16. A composition of claim 15, wherein the diamine is trimethylhexamethylene diamine.

17. A composition of claim 15, wherein the acid or derivative thereof is hexahydrophthalic.

18. A composition of claim 15, wherein the diol containing the neopentyl group branching is neopentyl glycol.

19. A composition of claim 15, wherein the straight chain diol is 1,6-hexanediol.

20. A composition of claim 15, wherein the equivalent ratio of diol to diacid is about 2:1 and the equivalent ratio of the urea to diamine to the polyester polyol is about 2:1:1.4. to 7.

* * * * *